March 27, 1951 D. CHARLES 2,546,255

FREQUENCY MULTIPLIER

Filed Oct. 25, 1947 2 Sheets-Sheet 1

INVENTOR

DANIEL CHARLES

BY Hazeltine Lake & Co.

AGENTS

INVENTOR
DANIEL CHARLES
BY Haseltine, Lake & Co.
AGENTS

Patented Mar. 27, 1951

2,546,255

UNITED STATES PATENT OFFICE 2,546,255

FREQUENCY MULTIPLIER

Daniel Charles, Paris, France, assignor to Compagnie Generale de Telegraphie Sans Fil, a corporation of France Application October 25, 1947, Serial No. 782,108
In France November 9, 1946

6 Claims. (Cl. 250—36)

The invention has for its object to provide a device adapted to transform a sinusoidal wave into a periodic wave comprising as components some harmonics of the sinusoidal wave; it is more especially applicable to obtaining saw-tooth waves such as those used as time bases.

The devices heretofore used as time bases may be reduced to three basic types: gas tube time bases, multi-vibrator time bases or over-biassed grid time bases. In all these cases, the method of operation used essentially depends upon the charging and the discharging of a condenser. Whatever may be their respective advantages, all these time bases have one common defect, namely, that of not operating at high frequencies. The secondary or parasitic capacities become larger than the capacity which is alternately charged and discharged, thus limiting the smallest capacity that can be used to a value which is too great for high frequency operation.

It is a further object of this invention to provide a generator of periodic waves of the kind mentioned which is free from the above-described drawback.

The foregoing objects and the invention itself will be better understood from a detailed description of some embodiments thereof taken in connection with the accompanying drawings wherein.

Figures 1, 2, 3, 4, 5:
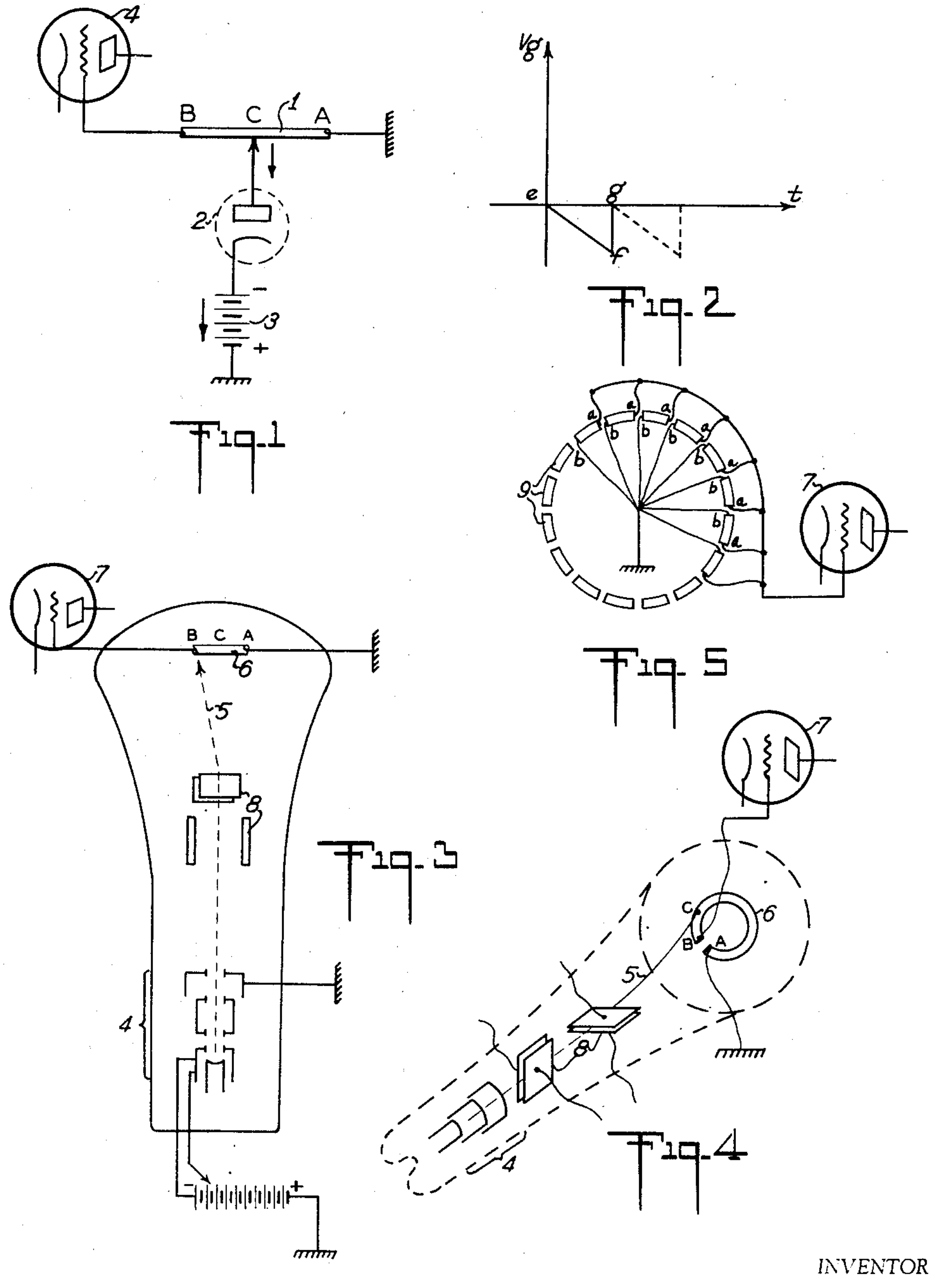
Figure 1 is a diagram of circuits used in explaining the principle of the operation of the invention.
Figure 2 shows a curve indicating the variations of grid voltage with time.
Figures 3 and 4 show diagrammatically one embodiment of the invention.
Figure 5:
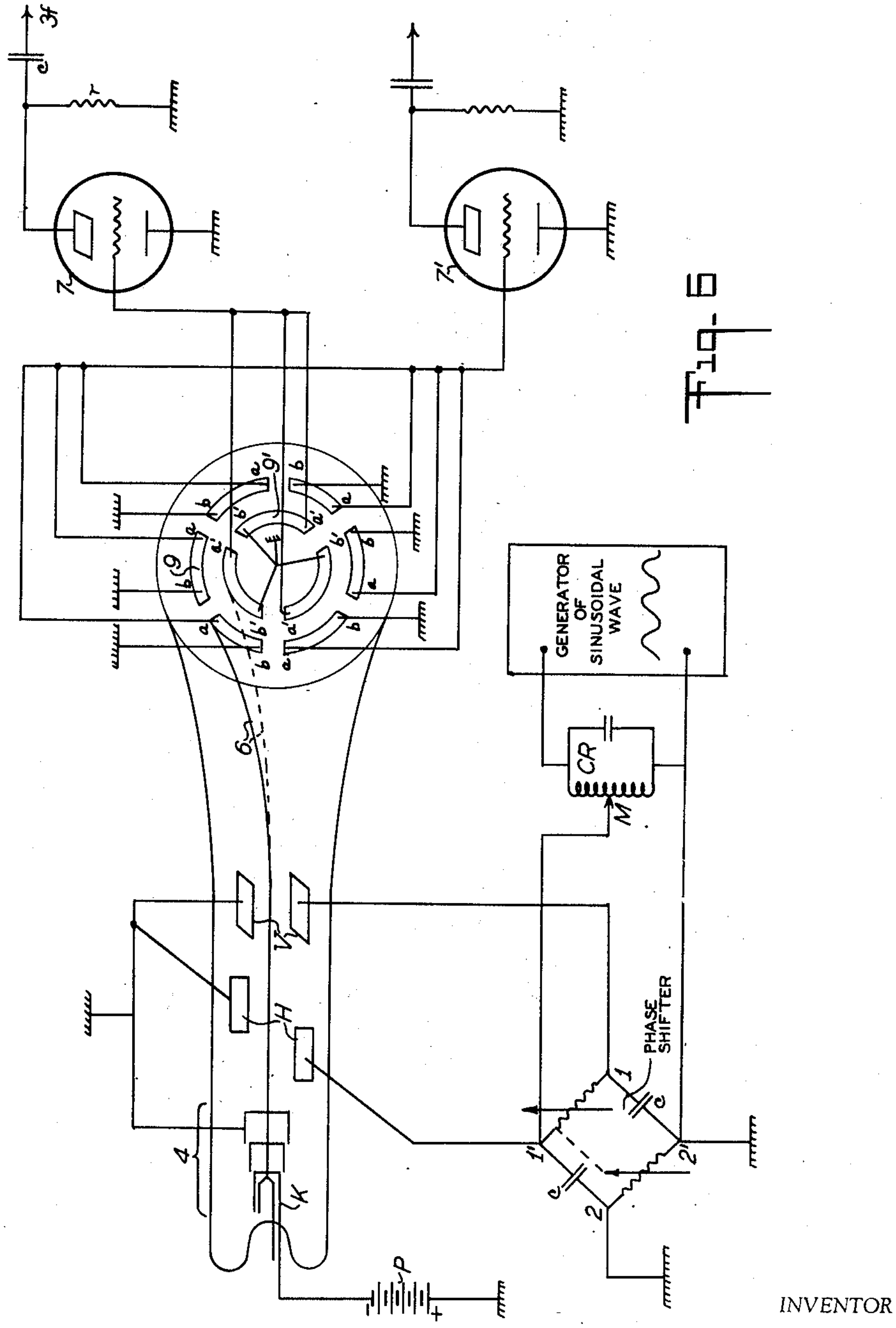

Figure 5 similarly shows another embodiment; and

Figure 6 shows similarly a still further embodiment including a plurality of concentric circumferences.

In Figure 1, 1 is an electric resistance, 2 a diode providing a constant current $i$, said diode being supplied by the source 3. Reference 4 designates a valve, the grid of which is at the potential of the point B. For a given position of the point C on the resistance, the portion AC through which the current $i$ flows produces a voltage drop $R_{AC}.i$, the point B is then at the potential of the point C, viz. $R_{AC}.i$ relatively to A. If the point C be caused to move from A to B as a function of time and in accordance with a predetermined law, the resistance $R_{AC}$ is expressed by the function of the time $r_t$, and the instantaneous potential of the grid of the valve 4 will be $V_g=r_t.i$. If it be assumed that $r_t$ is a linear function of the time, the potential of the grid will be represented by the portion $ef$ of the curve of Figure 2. If the point C can now be made to leave the resistance at B, the voltage of the grid will suddenly drop again to 0: the movement of C then corresponds to the portion $fg$ of the curve of Figure 2. Assuming that it is possible to cause the movable point C to return to A in an infinitely short time, a second curve, similar to the first one, can now be described, as indicated in dotted lines in Figure 2. In this figure, the characteristic features of the linear time base will be recognised.

In the device according to the present invention, the unit comprising the diode and the movable point of contact is provided by the elements of a cathode ray oscillograph, the screen of which is replaced by one or more resistances. Figures 3 to 5 of the accompanying drawing illustrate, in a non-limitative manner, two exemplary embodiments of the invention. In the device of Figures 3 and 4, the electron gun 4 of the cathode ray tube produces the movable beam 5 carrying the current $i$: 6 is the resistance R, 7 is the valve of the first stage of the amplifier, and 8 the beam-deflecting members.

In order to obtain a quick return form B to A, the resistance is curved into a circumferential arc, B and A being adjacent. Recourse to this shape involves the immediate and important consequence of necessitating a circular sweeping movement of the beam, which movement can readily be obtained from a sinusoidal wave: such movement is then made of uniform speed, which is necessary for obtaining the desired variations of resistance.

The device of the invention makes it possible to transform a sinusoidal oscillation, the frequency of which may amount to several megahertz, into a saw-tooth wave of the same fundamental frequency.

Instead of a single resistance of circular shape, it is possible to use a chain of suitably connected resistances arranged around the circumference of a circle, in such a manner that, if $n$ be the number of said resistances and $f$ the frequency of the sweeping oscillator, the fundamental frequency of the saw-toothed waves is $nf$. In this way, frequency multiplication can readily be effected. Owing to the fact that $n$ can easily be made equal to 10, it is possible, according to the invention, to obtain saw-teeth of frequencies of several tens of megahertz. Figure 5 shows a method of connecting the resistances of the chain. Reference 9 designates the said resistances, the ends $a$ of which are connected to the grid of the valve 7, while the ends $b$ are connected to earth. The arrangement of the elements is such that the parasitic capacities are very small, this condition being necessary in order to ensure good quality in the signals obtained.

One and the same envelope may contain a plurality of concentric circumferences, as shown in Fig. 6 comprising a number of resistances which increase from 1, so that, by acting on the amplitude of the circular sweep of the beam, it is possible to obtain for the saw-teeth fundamental frequencies which are multiples one of another. In Figure 6 are shown two circumferences of electrodes 9, 9′ presenting respectively two terminals *ab*, *a′b′*. These sets of terminals are connected, in the manner above described, to two amplifiers 7, 7′ respectively on which there is taken off voltages of frequencies that are multiples of the frequency *f* of the feeding sinusoidal voltage. The details of the devices feeding the deflection plates H and V comprise a generator of sinusoidal voltage of frequency *f*. A resonant circuit CR is fed by this generator and from this resonant circuit there is taken off a voltage of variable amplitude at a tap point M. The voltage thus obtained is applied to terminals 1′, 2′ of a capacity-resistance bridge constituting a dephasing device. The voltage thus applied is directly supplied to the deflection plates H. Said bridge as shown is of adjustable type and there appear, at its other terminals 1 and 2, a voltage dephased by 90° which is supplied to the deflection electrodes V. The foregoing arrangement constitutes a conventional circular sweep, the opening of the cone of which is adjusted by varying the tap at M.

Synchronisation is obtained by synchronising the local oscillator used for producing the sweeping movement of the beam.

I claim:

1. A generator of electric impulses comprising, on the interior of a vacuum enclosure, means for producing a cathode ray beam, means for impressing on said beam a circular sweep movement, a plurality of electrodes arranged along a circumference merging with the circular sweep trace by said beam, the said electrodes being distinctly separated one from the other, each of said electrodes being in the form of a band arranged along an arc of said circumference, and composed of a substance having a predetermined resistivity and being provided with an input terminal and an output terminal, and means for abstracting from each of said electrodes and between their two terminals a voltage periodically variable in time which steadily increases during each period and then suddenly drops to zero.

2. A generator of electric impulses comprising, on the interior of a vacuum enclosure, means for producing a cathode ray beam, means for impressing on said beam a circular sweep movement, a plurality of electrodes arranged along a plurality of concentric circumferences, means acting on said beam so as to merge said circular sweep trace with any one of said circumferences, said electrodes being distinctly separated one from the other, each of them having the form of a band arranged along an arc of one of said circumferences, each electrode being composed of a substance having a predetermined resistivity and provided with an input terminal and an output terminal, and means for abstracting from each of said electrodes and between their two terminals a voltage periodically variable in time which steadily increases during each period and then suddenly drops to zero.

3. A generator of electric impulses comprising, on the interior of a vacuum enclosure, means for producing a cathode ray beam, means for impressing on said beam a circular sweep movement, a plurality of electrodes arranged along a plurality of concentric circumferences, the number of electrodes on each of said circumferences being entire multiples one of the other, the said electrodes being distinctly separated one from the other, each of them having the form of a band arranged along an arc of one of said circumferences, and composed of a substance having a predetermined resistivity and provided with an input terminal and an output terminal, and means acting on said beam so as to merge the said circular sweep trace of the beam with any one of said circumferences and means for abstracting from said electrodes and between their two terminals a voltage periodically variable in time which steadily increases during each period and then suddenly drops to zero.

4. A generator of electric impulses comprising, on the interior of a vacuum enclosure, means for producing a cathode ray beam, means for impressing on said beam a circular sweep movement, a plurality of electrodes arranged along a circumference merging with the circular sweep trace by said beam, the said electrode being distinctly separated one from the other, each of said electrodes being in the form of a band arranged along an arc of said circumference, and composed of a substance having a predetermined resistivity and being provided with an input terminal and an output terminal, the input terminals of said electrodes being grounded and the output terminals connected in parallel to the grid electrode of an electron tube amplifier, located exteriorly of the said enclosure.

5. A generator of electric impulses comprising in the interior of a vacuum enclosure, an electron gun, two pairs of electrodes for deflecting the beam produced by said gun, in two mutually perpendicular directions, a generator of sinusoidal voltage of predetermined frequency, and adjustable amplitude, means for applying said voltage to the first pair of deflecting electrodes, means for dephasing said voltage by 90 degrees, means for applying the dephased voltage to the second pair of electrodes, a plurality of electrodes arranged along several concentric circumferences, one of said circumferences merging with the trace of the sweep of the said beam, means for adjusting the amplitude of said sinusoidal voltage so as to merge said sweep trace with any one of said circumferences, the said last mentioned electrodes being distinctly separated one from the other, each of them having the form of a band arranged along an arc of one of said circumferences and being composed of a substance having a predetermined resistivity and provided with an input terminal and an output terminal and means for abstracting from each of said last mentioned electrodes between their two terminals a voltage periodically variable in time which steadily increases during each period and then suddenly drops to zero.

6. Generator according to claim 5, in which for each of said circumferences the input terminals of said electrodes are grounded and the output terminals are connected in parallel to the grid electrode of an electron tube amplifier located exteriorly of said vacuum enclosure.

DANIEL CHARLES.

REFERENCES CITED

The following references are of record in the file of this patent:

UNITED STATES PATENTS

| Number | Name | Date |
|---|---|---|
| 1,929,067 | Hund | Oct. 3, 1933 |
| 2,245,670 | Hollmann | June 17, 1941 |
| 2,293,368 | Stuart | Aug. 18, 1942 |
| 2,374,666 | Cunniff | May 1, 1945 |
| 2,438,709 | Labin | Mar. 30, 1948 |